United States Patent Office 3,343,313
Patented Sept. 26, 1967

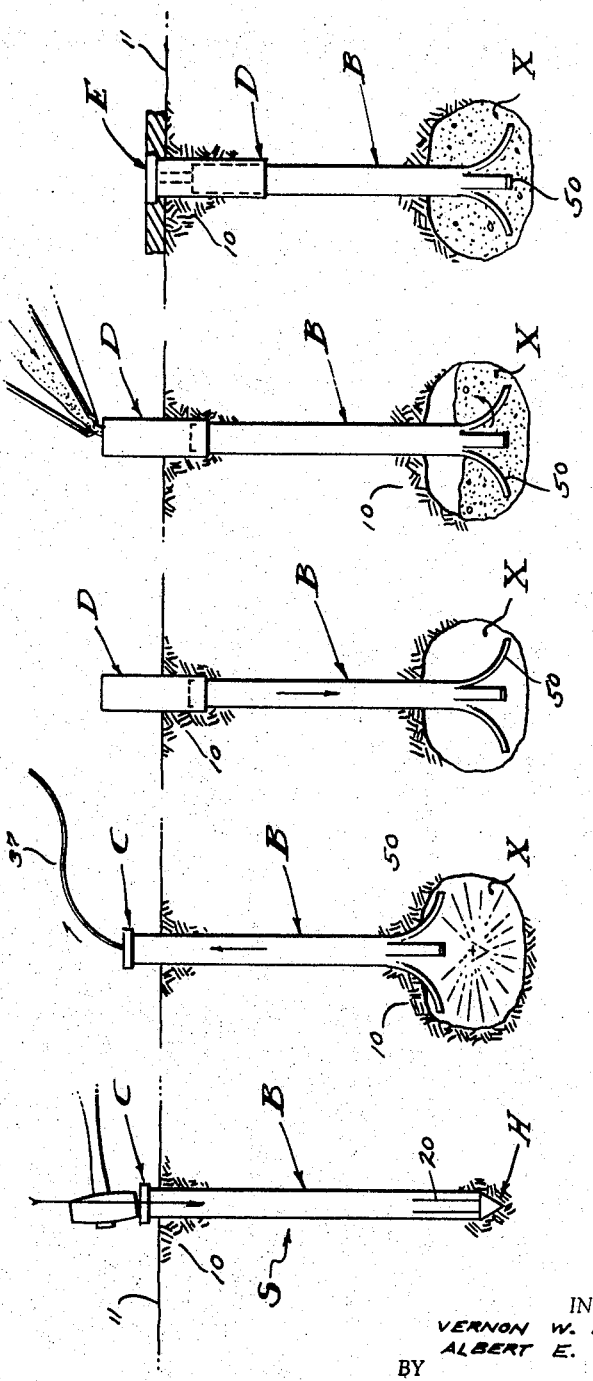

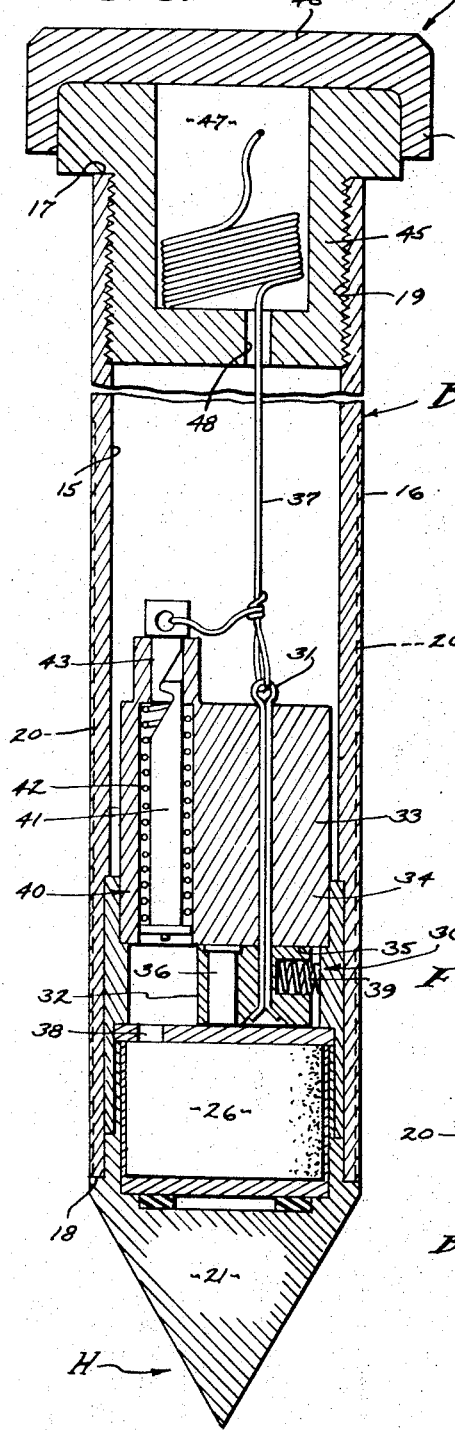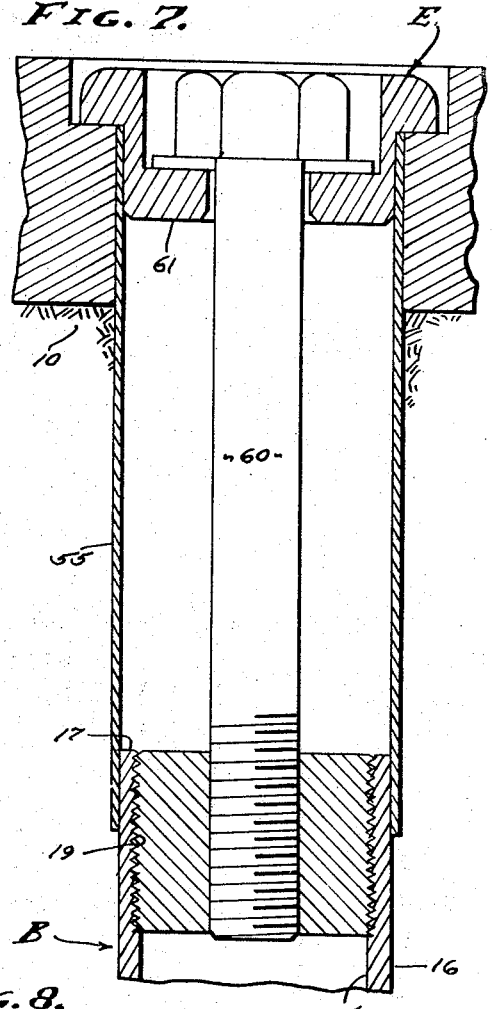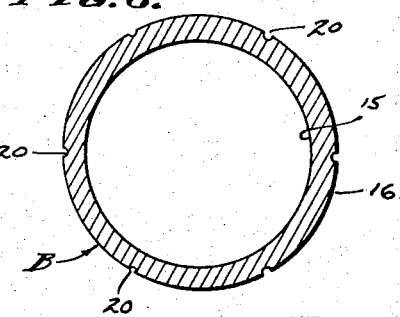

3,343,313
APPARATUS FOR INSTALLING CEMENTED ANCHORS
Vernon W. Luedloff, Torrance, and Albert E. Joneikis, Long Beach, Calif., assignors to Harvey Aluminum (Incorporated), Torrance, Calif., a corporation of California
Original application Jan. 15, 1963, Ser. No. 251,576, now Patent No. 3,222,842, dated Dec. 14, 1965. Divided and this application Nov. 3, 1965, Ser. No. 509,257
5 Claims. (Cl. 52—98)

ABSTRACT OF THE DISCLOSURE

Method and apparatus for installing cemented anchors in which integral driving stake and anchoring means are driven below ground level. An elongated hollow tubular stake includes longitudinally extending scorelines terminating at its ground piercing end. Explosive charge means located within the hollow tubular stake at the terminating ends of longitudinally extending scorelines remove the ground piercing end to permit passage of a fluid settable material. The explosive charge means also expands portions of the tubular stake, between scorelines, which act as anchor structure integral with the driving stake. The ground level end of the stake is constructed to receive plug means and/or ground tie adapter means. Driving cap means are provided for the ground level end of the hollow stake. Detonating means for the explosive charge means and safety-firing means are located within the hollow tubular stake.

---

This application is a division of application S.N. 251,576, filed Jan. 15, 1963, by Vernon W. Luedloff et al., now Patent No. 3,222,842, issued Dec. 14, 1965.

This invention relates to the cementing of anchors in the ground and is particularly concerned with an explosively expanded ground anchor that establishes a subterranean cave, or camouflet, which is filled with a material that sets so as to fix said anhcor solidly with respect to the surrounding earth formation.

The anchoring and securement of the equipment in a fixed and safe condition is a requirement in many activities and enterprises. For example, the tie-down requirement for aircraft is many times a critical necessity, due to the relatively light weight of the aircraft and due to the high wind forces encountered when the aircraft is grounded. Also, there are many mobile pieces of equipment which requires securement under certain circumstances, as for example various types of gun mounts and missile launchers. Further, the erection of buildings, either permanent or temporary, requires tie-down in many situations. Thus, it is apparent that there are many situations where anchors embedded in and beneath the ground are required, such as guy wire anchors used in the erection of poles or towers, and like structures.

A general object of this invention is to provide an anchor structure that is driveable into working position where it is operable to expand and form a cave, or camouflet, which can be filled with a solidifying material in order to fix the said anchor with respect to the surrounding earth formation.

It is also a general object of this invention to provide a method by means of which an anchor is driven into and fixed with respect to the surrounding earth formation.

It is an object of the method and apparatus hereinafter disclosed to provide an anchor which can be driven, as a stake, this being the first step of the method employing an explosively operated anchor that is later fixed in position by means of solidifying material.

It is an object of the method and apparatus hereinafter disclosed to provide an anchor which is explosively operable when positioned by a previous driving step to engage the earth formation by expanding action and simultaneously forming a cave, or camouflet, this being the second step of the method.

It is an object of the method and apparatus hereinafter disclosed to provide an anchor which can be properly positioned with respect to the earth formation following the said second explosive step, this being the third and/or intermediate step of the method.

It is an object of the method and apparatus hereinafter disclosed to provide an anchor which can be cemented in a fixed position relative to the earth formation, establishing a subterranean dead-man with an overlying cone of earth formation, this being the fourth step of the method. The said overlying cone of earth develops a holding power determined by the sum of the weight of earth contained within an overlying inverted cone thereof and of the cohesive resistance or shear strength of the said earth acting on the total peripheral surface area of the said same withdrawal cone.

It is an object of the method and apparatus hereinafter disclosed to provide an anchor which can be utilized to tie down surface equipment and structures by means of studs threaded or otherwise adjustably connected with a subterranean dead-man cemented in a cave or camouflet, this being the fifth step of the method.

It is also an object of this invention to provide an anchor structure wherein the body serves a multiplicity of functions, as a stake, as an explosive carrier, as an expanding "spider," as a pouring conduit, and as a tie-down element.

It is still another object of this invention to provide an explosive head adapted to be driven into the ground as by hammering and then operated to create a subterranean cave or camouflet, and means to safety the same during the driving or said hammering.

The various objects and features of this invention will be fully understood from the following detailed description of the typical preferred forms and applications thereof, throughout which description reference is made to the accompanying drawings, in which:

FIGS. 1 through 5 are sequential views that show the progressive steps involved in the installation of the anchor of the present invention, FIG. 1 showing the first step of driving the stake-like anchor, FIG. 2 showing the second step of detonation and ignition of the explosive element of the anchor, FIG. 3 showing the third step or intermediate step of relocating the anchor, FIG. 4 showing the fourth step and cementing operation involved in setting the anchor, and FIG. 5 showing the final disposition of parts and wherein the anchor is used to tie down equipment.

FIG. 6 is an enlarged detailed sectional view of the structure as it is used in FIG. 1 of the drawings above described.

FIG. 7 is an enlarged detailed sectional view of a portion of the structure as it is used in FIG. 5 of the drawings above described.

FIG. 8 is a sectional view taken as indicated by line 8—8 on FIG. 6.

It is well known that different earth formations possess different densities and different cohesive properties and weights and strengths. Therefore, experience and factual information can be used in order to determine exactly the holding power of a given anchor design beneath or within a certain body of earth formation. As expressed in the one foregoing objective, the holding power of the anchor hereinafter disclosed is the sum of the weight of effective overlying earth, the earth in an overlying inverted cone, and of the shear strength or cohesive resistance of the surface area of said effective earth or cone thereof. Thus, it is apparent that an exacting science is involved in determining said holding power, taking into account different types of earth and how they affect variations as for example in the overlying cone angle, etc.

The anchor of the present invention has utility in all angular dispositions, providing there is sufficient lateral supporting earth formation 10. Also, the anchor can be embedded in the earth formation 10 at any desired depth. In the drawings I have shown a vertically disposed installation of the anchor and at an angle normal to the ground surface 11. In accordance with the invention the method and apparatus involves, generally, the driving of a tubular body B into the ground, said body being provided with a sharpened earth piercing head H carrying an explosive charge that simultaneously destroys said head, opens the lower end of the body, and forms a cave or camouflet X. The structure is preferably of round cross-section with the head H at the lower end and with replaceable means at the upper end in order to convert the structure from a driving stake into a fixed anchor with tie-down capabilities. In carrying out the method and in making a suitable anchor structure there are three basic functions and related means provided for at the top end of the structure, a driving cap C, a pouring conduit D, and a tie-down adapter E. These means C, D and E are structural parts utilized separately in carrying out the method of installation, and the head H above referred to is destroyed in the process.

Primarily, the anchor involves the body B which is a tubular part of cylindrical form. Thus, the body has inner and outer walls 15 and 16, and it has top and bottom ends 17 and 18 in planes normal to a central axis. The body is made, for example, of steel tubing having substantial wall thickness and is characterized by internal threads 19 or other coupling means at the upper end portion and by longitudinal striations 20 at the lower end portion. The said striations are of substantial length and are a plurality in number, there being six striations as shown, and preferably cut into or suitably indented in the exterior wall 16. The striations 20 are straight and they terminate in a common transverse plane whereby circumferentially spaced lines of weakening are established for the deformation or reforming of the body B as and when internal pressures are applied. However, columnar strength of the body B is maintained and not materially affected by the presence of said striations.

The head H is pressed into and/or suitably secured to the lower end portion of the body, and for the most part it occupies the body B within the portion thereof weakened by the striations 20. The head H comprises an earth-piercing nose 21, an explosive charge 26, safety means 30 normally retained by a safety pin 31, and a firing means 40 operable when the safety means 30 is released. The explosive charge 26 is significantly located at the lower end portion of the body B within the striations 20 and above the bottom end 18.

The head H is composed of a sectional body fabricated of several or more parts, the nose section 21 of which is hard metal shaped as shown. The safety means 30 involves a fuze housing 34 with a transverse guideway 35 therethrough that slidably supports a slider block 32. The fuze housing 34 is closed by a fuze block 33 which captures the slider block 32 in the guideway 35. The slider block 32 carries a detonator cap 36 which is normally held positioned at the center axis of the structure by means of the retaining safety pin 31 which enters longitudinally through the fuze block 33 and through the slider block 32. The safety pin 31 is a cotter which has its ends deflected below the slider block 32 and has its loop end exposed and joined to a lanyard 37 extending upwardly through the body B and adapted to be pulled at the exterior of the structure.

Laterally of the central axis and parallel thereto there is a firing pin 41 on its axis. The said firing pin axis extends thorugh the guideway 35 and aligns with an ignition port 38 entering into the charge 26. As is indicated, the slider block 32 is shiftable to an armed position by a spring 39, whereby the detonating cap 36 aligns with the ignition port 38. Said armed position is permitted by pulling of the lanyard 37 thereby removing the safety pin 31 from the slider block 32. Having thus armed the head H, the firing pin 41 is operated by the continued pulling of the lanyard 37 and cocking of said pin 41 against a spring 42, and by withdrawal of a sear 43 from the fuze block 33. The sear 43 and pin 41 are normally coupled for pulling by means of a slip joint that is released by withdrawal of the sear from the confinement within an opening that slidably contains these two parts. Upon release of the biased firing pin 41 the detonating cap 36 is struck and the charge 26 is ignited thereby.

The driving cap C is provided in accordance with the first step of the method and is essentially a protective closure for the upper end 17 and which is suited to receive repeated hammer blows. The cap C also protects the threads 19 which are used for later purposes and is preferably a sectional cap comprising a plug 45 threaded into the body B and a pad 46 overlying the plug. The plug 45 is provided with an upwardly opening recess 47 that accommodates a length of lanyard 37 and an opening 48 in the plug passes the lanyard from within the tubular body B. The pad per se is a disc that closes the recess 47, having a depending protective lip 49.

In accordance with the first step of the method the stake S composed of the body B, head H and cap C hereinabove disclosed is placed in or driven into the earth and to a suitable depth as by hammering or the like, as shown in FIG. 1.

In accordance with the second step of the method the lanyard 37 is pulled and the charge 26 ignited as hereinabove described. Having buried the head H surrounded by the weakened body portion, said weakened portion is deformed from its initially preformed condition by splitting and dividing into the radial fingers that reform into a spider 50, as shown in FIG. 2. The fingers of the spider 50 curve gently outward substantially as shown, due to a ripping action initiated at the lower end of the body B and progressing upwardly.

The pouring conduit D is in the nature of a shield 55 that telescopes over the body B. Upon detonation and ignition of charge 26 the stake S is expanded at its lower end and a cave or camouflet X is simultaneously formed. With this action, and in actual practice, the stake S is raised or lifted upwardly as shown in FIG. 2. Therefore, the cap C is removed and the shield 55 is telescoped onto the body B and the body is lowered or properly repositioned by manipulation, this being the third and intermediate step of the method. Further, it is to be understood that the intermediate step can be performed after the next and fourth step to be described.

In accordance with the fourth step of the method the cave or camouflet is filled via the tubular body B and through the shield 55 which prevents earth formation from tumbling into the same. Any suitable solidifying fluid material can be employed for filling the cave or camouflet X, and preferably a cement Y or the like which hardens rapidly around the spider 50.

The tie-down adapter E replaces the plug 45 and comprises a stud 60 threadedly engaged in the threads 19 so as to project axially from the body B. In practice there is a bushing 61 that adjustably receives the stud 60, and said stud can be secured to an object or equipment Z as circumstances require, a typical securement being shown. From the foregoing it will be apparent that the steps hereinabove described together with this last and fifth step result in an anchor installation characterized by an enlarged dead-man that is buried in the earth formation substantially below the surface 11 thereof. A characteristic feature of the method and apparatus herein disclosed is the retention of one body part which serves the many purposes involved in the five steps enumerated and described. The original head H disintegrates upon ignition thereof and simultaneously opens the body B for passage of fluid or cement therethrough and into the cave or camouflet which is simultaneously established and formed by explosion of said head. It is a simple matter to relocate and properly position the body B after the said detonation and ignition of the explosive charge, following which the tubular body conducts a solidifying fluid, a cement, to occupy the cave or camouflet thus formed. As pointed out at the outset of this specification the holding power of such an installation can be readily determined through analysis of the particular earth formation involved taken in consideration with the effect of the overlying inverted cone of earth and of the cohesive resistance or shear strength thereof.

Having described only a typical preferred form and application of our invention, we do not wish to be limited or restricted to the specific details herein set forth, but wish to reserve to ourselves any modifications or variations that may appear to those skilled in the art and fall within the scope of the following claims.

Having described our invention, we claim:

1. Integral driving stake and subsurface ground anchor structure comprising
    an elongated hollow stake having a metallic tubular body which is imperforate between longitudinal ends,
    ground piercing means secured to and closing one longitudinal end of the elongated hollow stake,
    plug means for substantially closing the remaining longitudinal end of the elongated hollow stake and for retaining driving cap means,
    means for securing the plug means to the remaining longitudinal end of the elongated hollow stake,
    longitudinally extending striations formed in the metallic tubular body, the longitudinally extending striations terminating contiguous to the ground piercing end of the elongated hollow stake, the longitudinally extending striations comprising indentions which diminish sidewall strength of a portion of the tubular steel body at the ground piercing end of the elongated hollow stake, and
    means for positioning explosive charge means within the metallic tubular body in close proximity to the longitudinally extending striations at the ground piercing end of the elongated hollow stake so as to open the ground piercing end of the hollow stake upon explosion for passage of a semi-fluid, settable material through the elongated hollow stake and for expanding segments of the tubular steel body, at the ground piercing end of the elongated hollow stake between the longitudinally extending striations, laterally with respect to the remainder of the elongated hollow stake.

2. The structure of claim 1 in which the longitudinally extending striations terminate in a common transverse plane at the ground piercing end of the elongated hollow stake.

3. The structure of claim 1 further including explosive charge means positioned within the metallic tubular body adjacent to terminating ends of the longitudinally extending striations at the ground piercing end of the elongated hollow stake.

4. The structure of claim 3 further including means for actuating the explosive charge means which include detonating means normally held in safety position by pin means, and lanyard means extending through the plug means for withdrawal of the pin means holding the detonating means in safety position and for releasing firing pin means for detonating the explosive charge means.

5. Combined driving stake, subsurface ground anchor, and ground tie structure comprising
    an elongated tubular stake having ground piercing means secured to and closing one longitudinal end of the elongated tubular stake,
    securing means at the remaining longitudinal end of the the elongated tubular stake for interchangeably securing plug means and ground tie-down means to the remaining longitudinal end of the elongated tubular stake,
    longitudinally extending striations formed in the elongated tubular stake, the longitudinally extending striations terminating contiguous to the ground piercing end of the elongated tubular stake and diminishing sidewall strength of a portion of the elongated tubular stake, and
    means for positioning explosive charge means within the elongated tubular stake adjacent to terminating ends of the longitudinally extended striations at the ground piercing end of the elongated tubular stake so as to open the ground piercing end of the elongated tubular stake upon explosion for passage of a semi-fluid, settable material through the elongated tubular stake and for expanding segments of the tubular stake between longitudinally extending striations laterally with respect to the remainder of the elongated tubular stake.

References Cited

UNITED STATES PATENTS

| | | | |
|---|---|---|---|
| 3,115,226 | 12/1963 | Thompson | 52—98 |
| 3,228,153 | 1/1966 | Luedloff | 52—156 |
| 3,233,415 | 2/1966 | Thomas | 52—155 |

FRANK L. ABBOTT, *Primary Examiner.*

RICHARD W. COOKE, JR., *Examiner.*

R. S. VERMUT, *Assistant Examiner.*